United States Patent
Suzuki

(10) Patent No.: US 8,070,950 B2
(45) Date of Patent: Dec. 6, 2011

(54) BORON-REMOVING AGENT AND BORON REMOVAL METHOD UTILIZING XEROGEL

(75) Inventor: Hironori Suzuki, Tsukuba (JP)

(73) Assignee: Kowa Company, Ltd., Nagoya-shi, Aichi (JP)

( * ) Notice: Subject to any disclaimer, the term of this patent is extended or adjusted under 35 U.S.C. 154(b) by 165 days.

(21) Appl. No.: 12/523,858

(22) PCT Filed: Jan. 28, 2008

(86) PCT No.: PCT/JP2008/051178
§ 371 (c)(1),
(2), (4) Date: Jul. 20, 2009

(87) PCT Pub. No.: WO2008/093628
PCT Pub. Date: Aug. 7, 2008

(65) Prior Publication Data
US 2010/0101996 A1    Apr. 29, 2010

(30) Foreign Application Priority Data
Jan. 30, 2007 (JP) ................... 2007-019385

(51) Int. Cl.
| | |
|---|---|
| B01D 15/00 | (2006.01) |
| B01D 15/08 | (2006.01) |
| B01J 39/00 | (2006.01) |
| B01J 20/26 | (2006.01) |
| B01J 20/22 | (2006.01) |
| C02F 1/42 | (2006.01) |
| C02F 1/28 | (2006.01) |

(52) U.S. Cl. ......... 210/635; 210/668; 502/401; 502/402

(58) Field of Classification Search ............ 210/665, 210/668, 683, 502.1, 635; 502/401, 402
See application file for complete search history.

(56) References Cited

U.S. PATENT DOCUMENTS

| | | | |
|---|---|---|---|
| 4,078,129 | A | 3/1978 | Yamagata et al. |
| 5,180,497 | A | 1/1993 | Sando et al. |
| 5,241,045 | A | 8/1993 | Matz |
| 7,618,538 | B2 | 11/2009 | Palacios Donaque et al. |
| 2009/0050574 | A1 | 2/2009 | Suzuki et al. |

FOREIGN PATENT DOCUMENTS

JP    61-153193    7/1986
(Continued)

OTHER PUBLICATIONS

Machine Translation of JP2006096846, Apr. 2006.*
Yokoyama, F., "Morphology and structure of highly elastic poly(vinyl alcohol) hydrogel prepared by repeated freezing-and-melting", 1986. Colloid & Polymer Science 264:595-601.*

(Continued)

*Primary Examiner* — Nam Nguyen
*Assistant Examiner* — Nader Hossaini
(74) *Attorney, Agent, or Firm* — Knobbe, Martens, Olson & Bear, LLP

(57) ABSTRACT

Disclosed is a boron removal method which can remove boron from boron-containing water satisfactorily by using a small amount of a chemical agent, and which generates small amount of precipitate. Also disclosed is a boron-removing agent which is easy to handle and has excellent boron-adsorption ability. A xerogel of an organic polymeric compound having a cis-type diol structure and a water-soluble salt of an alkaline earth metal are added to a boron-containing water under alkaline conditions.

6 Claims, 4 Drawing Sheets

FOREIGN PATENT DOCUMENTS

| | | |
|---|---|---|
| JP | 2002-186976 | 7/2002 |
| JP | 2002-226517 | 8/2002 |
| JP | 2004-292479 | 10/2004 |
| JP | 2006-096846 | 4/2006 |

OTHER PUBLICATIONS

International Search Report for PCT/JP2008/051178 dated May 1, 2008.

* cited by examiner

[Fig. 1]
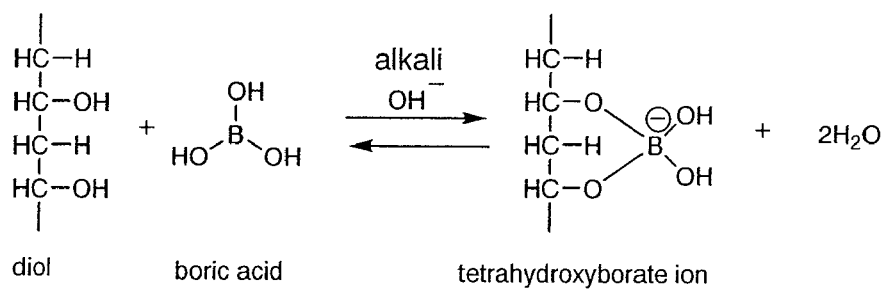
[Fig. 2]
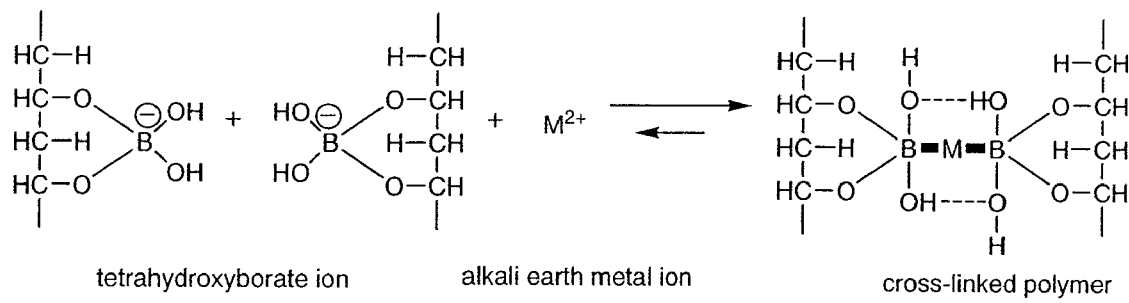

[Fig. 3-1]
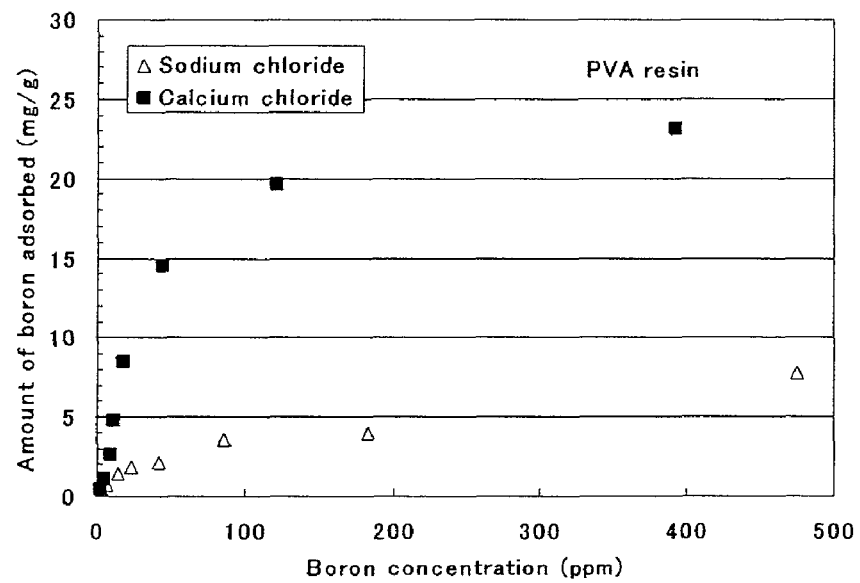
[Fig. 3-2]
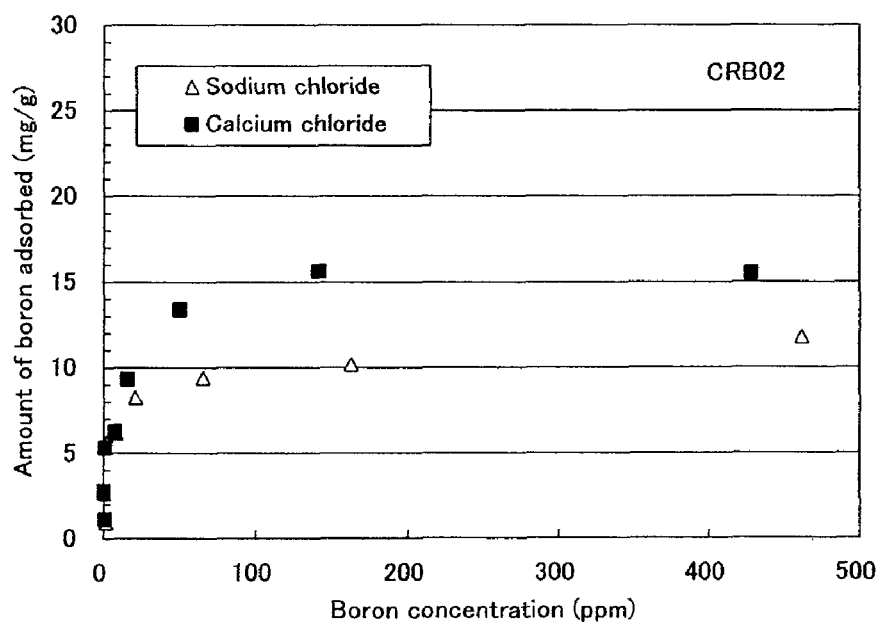

[Fig. 3-3]
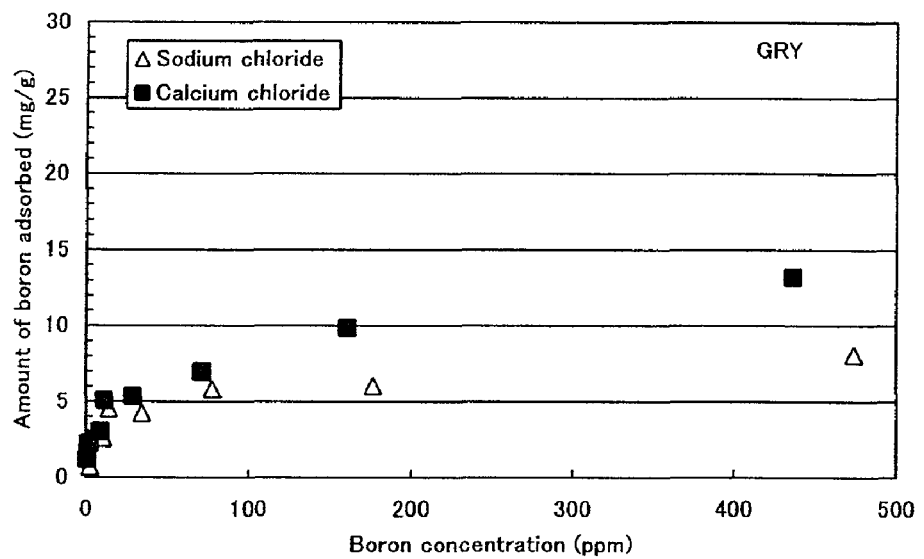
[Fig. 4]
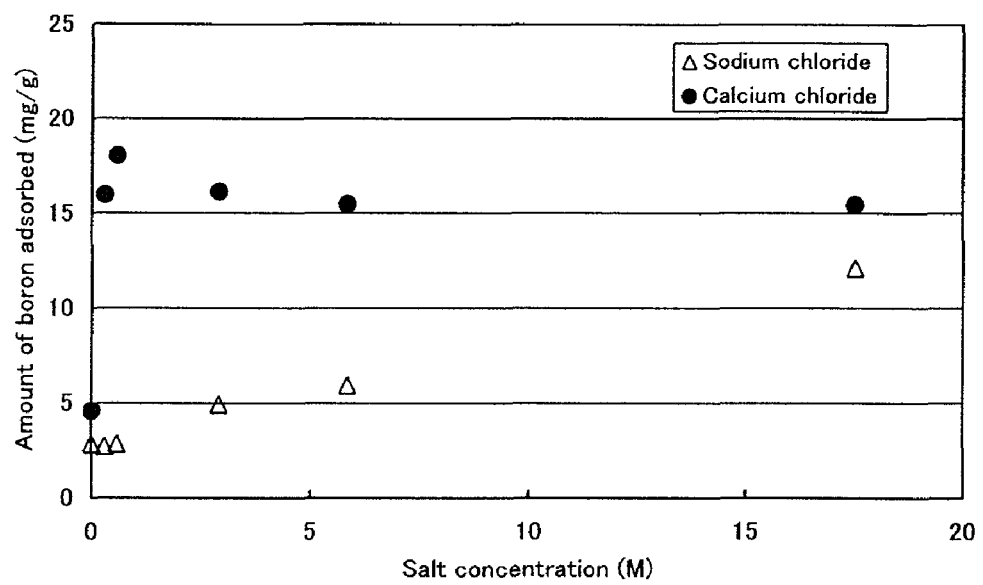

[Fig. 5]
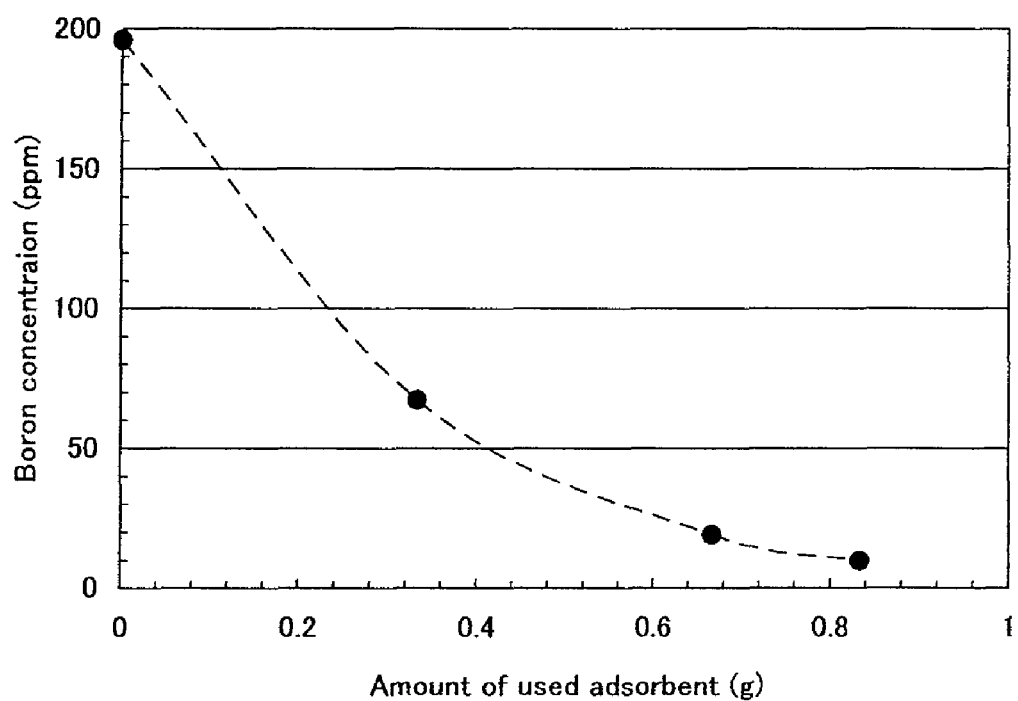

BORON-REMOVING AGENT AND BORON REMOVAL METHOD UTILIZING XEROGEL

CROSS-REFERENCE TO RELATED APPLICATIONS

This application is the U.S. National Phase under 35 U.S.C. §371 of International Application PCT/JP2008/051178, filed Jan. 28, 2008, which was published in a non-English language, which claims priority to JP Application No. 2007-019385, filed Jan. 30, 2007.

TECHNICAL FIELD

The present invention relates to an agent for removing boron and a method of removing boron, which are used for removing boron present in the form of a boric acid, a borate, or a borate ion from boron-containing water. The present invention particularly relates to an agent for removing boron and a method of removing boron, which can remove boron with a small amount of a chemical agent (agent for removing boron) and can suppress the amount of a generated precipitate (sludge).

BACKGROUND ART

Boron is used in various manufacturing industries of electroplating, enamelware, glaze, clay roofing tile, electrical part, and the like, and waste water discharged in the manufacturing processes of those products contains a large amount of boron. However, a large amount of boron is known to exert harmful influences on environment and to cause symptoms of poisoning on the human body, such as gastrointestinal disorder, rubedo, and central nervous system symptom.

Therefore, the Water Pollution Prevention Law was revised in June, 2001, and, in addition to the conventional regulation of the discharge of water containing heavy metals and organochlorine compounds, the regulation of discharge of water containing boron started. The standard for discharge of water containing boron and its compounds is set below 10 mg per L of water (below 10 ppm) in freshwater environments such as a river, and below 230 mg per L of water (below 230 ppm) in seawater environments.

Conventionally, the following methods have been employed for treating boron-containing waste water: a method in which magnesium oxide in an amount 5 to 10 times or more (molar ratio) as large as that of boron is added to boron-containing waste water, the pH is adjusted to 10 or higher with alkali hydroxide to form an insoluble precipitate, and then the formed insoluble precipitate is removed; a method in which a large amount of aluminum salt is added, the pH is adjusted to 10 or higher with slaked lime to form an insoluble precipitate, and the insoluble precipitate is removed similarly as in the above-mentioned method; a method in which zirconium oxide in an amount equivalent to that of boron is added to form an insoluble precipitate, and the insoluble precipitate is removed; and a method in which a boron-selective ion exchange resin is brought into contact with boron-containing waste water to remove boron by adsorption.

However, the methods in which an insoluble precipitate is formed using magnesium oxide or aluminum salt for removing boron each require a large amount of a chemical agent and generate a large amount of precipitate. Thus, the methods were not economical. Moreover, the number of remaining years to use final disposal sites is limited, and hence generation of large amounts of wastes should be avoided. According to the method of removing boron using zirconium oxide, boron can be removed with a smaller amount of a chemical agent, and the amount of generated precipitate is smaller as compared with the above-mentioned methods, but there was the following problem. The solid-liquid-separation properties of the generated sludge are low, and moreover, because zirconium is a rare metal, such a method is not economical. The method using a boron-selective ion exchange resin also requires a large amount of an expensive boron-selective ion exchange resin. Thus, the method was not economical.

Under such a technical background, methods of removing boron that are performed simply and with low cost and that have sufficient effects have been studied. For example, there has been reported a method of removing boron in a solution using a gel-like polyvinyl alcohol (Patent Document 1). However, according to this method, boron is adsorbed in the vicinity of the surface of the gel-like polyvinyl alcohol for separating a boron-binding gel. Thus, although a large amount of a chemical agent is used, the amount of boron that can be bound is small. Thus, there was the following problem. In order to remove boron from water containing boron at high concentration and to reduce the concentration of boron 10 ppm or lower by using this method, a large amount of a chemical agent and a prolonged reaction time are required. Moreover, a large amount of calcium aluminate sulfate, calcium sulfate, calcium aluminate, or ferric hydroxide should be blended in the process of gel formation in order that a large amount of boron is bonded. Therefore, there was a problem in that it was impossible to reduce the amount of a boron-treating agent and a large amount of sludge was generated. In addition, the strength and manner of use of the gel need to be adjusted, and there were problems of lowering of the boron-treating ability due to drying of the gel and the increase in cost of preservation and transport for preventing the lowering. Under such circumstances, it has been desired to develop a method of removing boron capable of sufficiently removing boron with a small amount of a chemical agent and capable of suppressing the amount of generated sludge, and an agent for removing boron which is used for the method and is easy to handle.

Patent Document 1: JP 2002-186976 A

DISCLOSURE OF THE INVENTION

An object of the present invention is to provide a simple method of removing boron capable of sufficiently removing boron from boron-containing water with a small amount of a chemical agent and capable of suppressing the amount of a generated precipitate, and an agent for removing boron which has a high boron-adsorption ability and is very easy to handle.

The inventors of the present invention have carried out extensive researches to solve the above-mentioned problems, and, as a result, found that a high boron-removing effect can be achieved by adding a xerogel of an organic polymeric compound having a cis-type diol structure typified by a polyvinyl alcohol and a water-soluble salt of an alkaline earth metal to boron-containing water. The present invention has been accomplished based on the finding.

That is, the present invention is as follows:

(1) a method of removing boron from boron-containing water, including adding a xerogel of an organic polymeric compound having a cis-type diol structure and a water-soluble salt of an alkaline earth metal to boron-containing water under an alkaline condition;

(2) a method of removing boron from boron-containing water according to the item (1), in which the organic polymeric compound is one kind or two or more kinds selected from the group consisting of a polyvinyl alcohol, an N-methylglucamine resin, and an N-methylglucamine fiber;

(3) a method of removing boron from boron-containing water according to the item (1) or (2), in which the water-soluble salt of an alkaline earth metal is one kind or two or more kinds selected from the group consisting of calcium chloride, calcium nitrate, calcium bromide, calcium iodide, magnesium chloride, magnesium carbonate, magnesium bromide, magnesium chromate, barium bromide, magnesium sulfate, barium iodide, barium chloride, barium sulfate, barium nitrate, and barium hydroxide;

(4) an agent for removing boron from boron-containing water, including a xerogel of an organic polymeric compound having a cis-type diol structure and a water-soluble salt of an alkaline earth metal;

(5) an agent for removing boron from boron-containing water according to the item (4), in which the organic polymeric compound is one kind or two or more kinds selected from the group consisting of a polyvinyl alcohol, an N-methylglucamine resin, and an N-methylglucamine fiber; and (6) an agent for removing boron from boron-containing water according to the item (4) or (5), in which the water-soluble of an alkaline earth metal is one kind or two or more kinds selected from the group consisting of calcium chloride, calcium nitrate, calcium bromide, calcium iodide, magnesium chloride, magnesium carbonate, magnesium bromide, magnesium chromate, barium bromide, magnesium sulfate, barium iodide, barium chloride, barium sulfate, barium nitrate, and barium hydroxide.

BRIEF DESCRIPTION OF THE DRAWINGS

FIG. 1 illustrates an equilibrium reaction formula between a diol and boric acid.

FIG. 2 illustrates an equilibrium reaction formula between a boric acid-xerogel condensate and an alkaline earth metal ion.

FIG. 3-1 is a graph illustrating a boron adsorption isotherm for a polyvinyl alcohol (PVA resin).

FIG. 3-2 is a graph illustrating a boron adsorption isotherm for an N-methylglucamine resin (CRB resin).

FIG. 3-3 is a graph illustrating a boron adsorption isotherm for an N-methylglucamine fiber (GRY fiber).

FIG. 4 is a graph illustrating the salt concentration dependence of the amount of boron adsorbed on the PVA resin.

FIG. 5 is a graph illustrating the relationship between the amount of a boron adsorbent used and the concentration of residual boron in the multistep method.

BEST MODE FOR CARRYING OUT THE INVENTION

Hereinafter, the method of removing boron and the agent for removing boron of the present invention will be described in detail.

The method of removing boron of the present invention from boron-containing water is characterized by including adding a xerogel of an organic polymeric compound having a cis-type diol structure (hereinafter sometimes simply referred to as "xerogel") and a water-soluble salt of an alkaline earth metal to boron-containing water under an alkaline condition. In the present invention, the term "xerogel" refers to a dried gel that may be added to water and separated from water by solid-liquid separation. The cis-type diol structure of the organic polymeric compound forming the xerogel acts as an adsorption site of a borate ion.

The shape of the xerogel is not particularly limited as long as the shape is suitable for addition to boron-containing water, and is preferably granule or sheet.

The organic polymeric compound having a cis-type diol structure is not particularly limited as long as the compound can adsorb boron. Examples thereof include a polyvinyl alcohol, an N-methylglucamine resin obtained by binding an N-methylglucamine group to a resin, an N-methylglucamine fiber obtained by binding an N-methylglucamine group to an organic compound fiber via a cross-linker, and a polymer obtained by introducing a polyhydroxyalkylamino group into a crosslinkable copolymer including a methacrylic ester of glycidyl methacrylate and polyol. Of those, the polyvinyl alcohol, the N-methylglucamine resin, and the N-methylglucamine fiber are particularly preferably used.

In a polyvinyl alcohol, a part of hydroxyl groups may be replaced by ionic or non-ionic groups or may be polymerized with ionic or non-ionic groups. The polymerization degree of the polyvinyl alcohol can be determined depending on boron concentration of boron-containing water to be treated. The polymerization degree is not particularly limited, and is preferably 100 to 2,500, and more preferably 1,000 to 2,000. Also, the average saponification degree is not particularly limited, and in view of the boron-adsorbing ability and shape retention, a polyvinyl alcohol having an average saponification degree of 85 mol % or more is preferable, and a completely saponified polyvinyl alcohol having an average saponification degree of 98 mol % or more is particularly preferable. Preferable examples of commercially-available products include Kuraray Poval PVA 117 (manufactured by Kuraray Co., Ltd.), Gohsenol NH-20 (Nippon Synthetic Chemical Industry Co., Ltd.), and completely saponified resins such as J-POVAL JF-17 and VF-17 (manufactured by Japan Vam & Poval Co., Ltd.).

The xerogel of a polyvinyl alcohol may be manufactured by, for example, a phase separation method in which pores are formed based on a phase-separation phenomenon in a polymer solution (such as a freeze-drying method), an extraction method involving dispersing an additive in a polymer by mixing, molding the mixture, and forming pores by extraction, or a method in which pores are formed by cutting a part of polymer chains and performing a binding reaction. In a xerogel having pores formed, a cross-linkage via the alkaline earth metal ions, which is described later, is formed easily. Therefore, a boron-adsorbing reaction is promoted, and it is possible to remove boron up to a lower concentration.

The thus-manufactured polyvinyl alcohol xerogel is preferably further subjected to a heat treatment. The heat treatment can enhance the strength of a polyvinyl alcohol and prevent dissolution of the polyvinyl alcohol xerogel in boron-containing water (to impart water resistance). The heat treatment is performed at a temperature of preferably 100 to 200° C., and particularly preferably 150 to 190° C.

Examples of resins forming the N-methylglucamine resin include styrene-based resins. Those resins may be manufactured by conventional methods or may be commercially-available products. Examples of the commercially-available products include Dia-ion CRB02 (manufactured by Mitsubishi Chemical Corporation), Amberlite IRA-743 (manufactured by Rohm and Hass Company), and Eporas B1 (Miyoshi Oil & Fat CO., Ltd.). The N-methylglucamine resin xerogel to be used in the method of removing boron of the present invention may be manufactured by a conventional method using the above-mentioned resins.

Examples of fibers forming the N-methylglucamine fiber include natural fibers such as cellulose and synthetic fibers such as rayon and vinylon. The fibers may be manufactured by conventional methods or may be commercially-available products. Examples of the commercially-available products include Chelest Fiber GCP and Chelest Fiber GRY (manufactured by Chubu Chelest Co., Ltd.). The N-methylglucamine fiber xerogel to be used in the method of removing boron of the present invention may be manufactured by a conventional method using the above-mentioned fibers.

The xerogel to be used in the method of removing boron of the present invention can adsorb borate ions when the xerogel is added to boron-containing water under an alkaline condition. Specifically, if the xerogel is added to boron-containing water while the boron-containing water is adjusted to alkaline with a pH adjuster such as sodium hydroxide, borate ions present in the boron-containing water are condensed by dehydration with cis-type diol parts of the organic polymer compound forming the xerogel, to thereby form a chelate (FIG. 1).

The water-soluble salt of an alkaline earth metal used in the present invention refers to a salt of an alkaline earth metal having a dissolving concentration to water of 0.1 mol/l or more. Examples of the water-soluble salt of an alkaline earth metal include a water-soluble magnesium salt, calcium salt, and barium salt. Specifically, examples thereof include calcium chloride, calcium nitrate, calcium bromide, calcium iodide, magnesium chloride, magnesium carbonate, magnesium bromide, magnesium chromate, barium bromide, magnesium sulfate, barium iodide, barium chloride, barium sulfate, barium nitrate, and barium hydroxide. In the present invention, from the viewpoint of a boron-absorbing ability, a calcium salt, a magnesium salt, or a barium salt is preferably used. Of those, calcium chloride, magnesium chloride, or barium chloride is preferably used.

If the water-soluble salt of the alkaline earth metal is added to boron-containing water, the salt is easily dissolved in water to form an alkaline earth metal ion. Via the alkaline earth metal ion, borate ions which form a chelate with the xerogel can crosslink with each other (FIG. 2). As a result, the xerogel, which is swollen by the repulsion of the negative charges of the borate ions, is considered to contract by neutralization of the alkaline earth metal ion (see Example 6). Therefore, the xerogel that adsorbs boron has increased its strength and is more easily separated from water.

Boron can be removed from boron-containing water by adding a xerogel and a water-soluble salt of an alkaline earth metal to boron-containing water under an alkaline condition. The addition method is not particularly limited as long as the xerogel and the water-soluble salt of an alkaline earth metal can be brought into contact with the boron-containing water so that the xerogel and the water-soluble salt of an alkaline earth metal can exert the above-mentioned effects. For example, boron can be removed by adding the xerogel and the water-soluble salt of an alkali earth metal to the boron-containing water simultaneously or separately, followed by stirring. Also, boron can be removed by placing or fixing the xerogel and the water-soluble salt of an alkaline earth metal in a circulation container and circulating boron-containing water adjusted to an alkaline pH or by placing or fixing the xerogel in a circulation container and circulating boron-containing water which contains the water-soluble salt of an alkaline earth metal.

In the method of removing boron of the present invention, the concentration of the xerogel added can be optimally determined according to boron concentration in boron-containing water to be applied. Usually, it is preferred that the concentration of the xerogel be 1 to 1,000 times by mass, and preferably 25 to 500 times by mass with respect to the content of boron (sum of the concentrations of borate ion, boric acid, and borate) in boron-containing water.

Meanwhile, as for the concentration of the water-soluble salt of an alkali earth metal to be added to the boron-containing water, the concentration of the alkaline earth metal ion in the boron-containing water is adjusted preferably in the range of 0.1 mM to 1.0 M, and more preferably in the range of 0.5 mM to 0.3 M.

The boron-containing water may have an alkaline pH, and the pH value is preferably 8 to 13, and more preferably 9.5 to 11.5. The pH may be adjusted with a pH adjuster such as caustic soda (sodium hydroxide), if necessary. Adjustment of the pH may be performed before or after addition of the xerogel or before or after addition of the water-soluble salt of an alkali earth metal. Usually, boron is preferably removed by: adjusting the pH of boron-containing water to alkaline; adding the xerogel and water-soluble salt of an alkaline earth metal; and stirring the mixture.

In the above-mentioned method of removing boron of the present invention, an agent for removing boron from boron-containing water containing a xerogel of an organic polymeric compound having a cis-type diol structure and a water-soluble salt of an alkaline earth metal (hereinafter, sometimes also referred to as "agent for removing boron of the present invention") may be used. The product form of the agent for removing boron of the present invention is not particularly limited, and for example, the agent may be a product composed of a xerogel including a water-soluble salt of an alkaline earth metal or a kit including a xerogel and a water-soluble salt of an alkaline earth metal in combination. The agent for removing boron which is composed of a xerogel including a water-soluble salt of an alkaline earth metal can be manufactured by immersing the xerogel in an aqueous solution of the water-soluble salt of an alkaline earth metal and drying the mixture or by dissolving both an organic polymer compound used as a material of the xerogel and the water-soluble salt of an alkaline earth metal in water and freeze-drying the resultant product.

The content ratio (by mass) of the xerogel and water-soluble salt of the alkaline earth metal in the agent for removing boron of the present invention is 1,000:1 to 5:4, and preferably 100:1 to 5:3.

A method of using the agent for removing boron of the present invention is not particularly limited as long as the purpose of the present invention can be achieved. Examples thereof include: a method in which the agent for removing boron is added to boron-containing water under an alkaline condition and stirred; and a method in which boron-containing water is circulated in a circulation container where the agent for removing boron is placed or fixed under an alkaline condition.

In the method of removing boron of the present invention, there may be employed a single-step method in which a process of pH adjustment, addition of a xerogel and a water-soluble salt of an alkaline earth metal to boron-containing water, and removal of the xerogel is performed only one time to decrease the concentration of boron one time. However, it is preferable to employ a multistep method in which a process of pH adjustment, addition of a xerogel and a water-soluble salt of an alkaline earth metal to boron-containing water, and removal of the xerogel is repeated several times to gradually decrease the concentration of boron after the xerogel and water-soluble salt of the alkaline earth metal are divided into small amounts. According to the multistep method, a larger amount of boron can be removed with the same amount of a chemical agent as that in the single-step method.

In the case where the concentration of an alkaline earth metal in an untreated boron-containing water is extremely high, the boron-containing water is preferably treated preliminarily by a method in which carbon dioxide gas is charged into the solution to precipitate the metal as carbonate or by a method in which a polyvalent anion such as phosphate or sulfate is added to promote precipitation of the alkaline earth metal salt. In addition, the boron-containing water may also be treated preliminarily using a cation exchange resin. This treatment is performed because, if a xerogel with a small particle size is used in boron-containing water containing an alkaline earth metal salt at a very high concentration particularly, it may be impossible to remove boron efficiently because the xerogel may aggregate to facilitate formation of flocs before a reaction with boron, and moreover, handling efficiency is deteriorated.

In the method of removing boron of the present invention, the xerogel which adsorbs boron may be collected from water solution and incinerated or carbonized by thermal decomposition. This can greatly decrease the amount of wastes (sludge) discharged to a final disposal site. Usually, the process is desirably performed by: collecting from boron-containing water the xerogel which adsorbs boron; removing water by a dehydration treatment; drying the resultant product; and performing thermal decomposition.

In thermal decomposition, if a treatment is performed under an inert gas atmosphere, carbonization is promoted. However, in order to suppress generation of unbured products (carbide) and to increase combustion efficiency, burning is performed better while air or oxygen is supplied.

A thermal decomposition temperature is desirably 500° C. to 1,500° C., and more desirably 700° C. to 1,200° C.

Hereinafter, the present invention will be described in more detail with reference to examples, but the present invention is not limited to the examples.

EXAMPLES

The present invention will be described in more detail with reference to the following specific examples.

Example 1

Boron-Removing Effect of PVA Resin (Xerogel) by Added Salt

A PVA resin (xerogel) was prepared using a completely saponified PVA having a polymerization degree of 1,700 (manufactured by Kuraray Co., Ltd., PVA117). An aqueous PVA solution (10%) obtained by dissolving PVA with boiling water was transferred into a petri dish and freeze-dried. The dried product was pulverized and classified by a sieve (1.0 mm or less), and the resultant product was used as an adsorbent. In the present description, PVA stands for polyvinyl alcohol.

Boron-containing water (30 mL), prepared so as to contain about 200 ppm of boron, was poured into a centrifuge tube, and caustic soda was added to adjust the pH. The resultant water was used as raw water before a boron-removing treatment. A PVA resin (0.1 g) was added thereto, and the whole was shaken on a shaker (140 rpm) for about 1 day to perform a boron-removing treatment. The concentrations of boron in the raw water and the treated water were determined with an ICP emission spectrometer.

In the case where a salt was added, in the same way as above, a salt was preliminarily added, to have 0.01 M, to Boron-containing water (30 mL), prepared so as to contain about 200 ppm of boron, and the pH was adjusted with caustic soda, to thereby prepare raw water. A PVA resin (0.1 g) was added thereto, and a boron-removing treatment was performed in the same way as above. As the added salt, sodium chloride (NaCl), lithiumchloride (LiCl), potassium chloride (KCl), tetramethylammonium chloride (TMAC), calcium chloride ($CaCl_2$), or sodium sulfate ($Na_2SO_4$) was used.

Table 1 shows the concentrations of boron in the raw waters and treated waters, the pH values adjusted, and the amounts of boron adsorbed. The results show that addition of a salt is effective to increase the amount of boron adsorbed. In particular, the addition of calcium chloride (salt of alkaline earth metal) was found to be more effective to increase the amount of boron adsorbed.

TABLE 1

| Sample No. | Adsorbent | Added salt | Concentration in raw water (mg/L) | pH | Concentration in treated water (mg/L) | Amount of boron adsorbed (mg/g) |
|---|---|---|---|---|---|---|
| 1 | PVA resin | — | 191 | 10.49 | 180 | 3.2 |
| 2 | PVA resin | NaCl | 194 | 10.48 | 175 | 5.5 |
| 3 | PVA resin | LiCl | 193 | 10.44 | 177 | 4.8 |
| 4 | PVA resin | KCl | 194 | 10.48 | 178 | 4.8 |
| 5 | PVA resin | TMAC | 196 | 10.47 | 175 | 6.2 |
| 6 | PVA resin | $CaCl_2$ | 197 | 10.47 | 134 | 18.8 |
| 7 | PVA resin | $Na_2SO_4$ | 192 | 10.50 | 174 | 5.4 |

Example 2

Boron-Removing Effect of Adsorptive Composition Composed of PVA Resin Including Alkaline Earth Metal Salt (PVA-Type Agent for Removing Boron)

An aqueous PVA solution (10%) was prepared, and calcium chloride (alkaline earth metal salt) was added in an amount of 1/9 times (by weight) the weight of PVA, followed by stirring. The homogeneous solution was freeze-dried and pulverized with a mill, to thereby obtain an absorptive compound PVA (Ca) resin.

In the same way as above, an aqueous PVA solution (10%) was prepared, and magnesium chloride hexahydrate was added in an amount of 2/7 times (by weight) the weight of PVA, followed by stirring. The solution was freeze-dried and pulverized with a mill, to thereby obtain an absorptive compound PVA (Mg) resin.

In the same way as above, an aqueous PVA solution (10%) was prepared, and barium chloride dihydrate was added in an amount of 5/8 times (by weight) the weight of PVA, followed by stirring. The solution was freeze-dried and pulverized with a mill, to thereby obtain an absorptive compound PVA (Ba) resin.

The adsorptive compositions were separately pulverized and subjected to a heat treatment (160° C.).

Boron-containing water (30 mL), prepared so as to have an initial boron concentration of about 100 ppm, was poured into a centrifugation tube, and the pH was adjusted with caustic soda. The water was used as a raw water. Thereafter, predetermined amounts of the adsorptive compositions were separately added so that the salt concentrations were 0.01 M, and the mixtures were stirred and reacted for 22 hours to perform a boron-removing treatment.

For comparison, experiments were performed in the same manner as in Example 1 by separately adding a PVA resin (0.1 g) and an alkaline earth metal salt (0.01M) to boron-containing water (Samples 1, 3, and 5).

The concentrations of boron in the raw water and the treated liquid phases were determined with an ICP emission spectrometer. Table 2 shows the concentrations of boron in the raw waters and treated waters, the pH values adjusted, and the amounts of boron adsorbed.

The results show that the absorbing ability of a PVA resin including a salt is almost the same as that of a resin to which a salt is added in another step.

TABLE 2

| Sample No. | Adsorbent | Added salt | Concentration in raw water (mg/L) | pH | Concentration in treated water (mg/L) | Amount of boron adsorbed (mg/g) |
|---|---|---|---|---|---|---|
| 1 | PVA resin | $MgCl_2 \cdot 6H_2O$ | 99.1 | 10.56 | 70.0 | 8.7 |
| 2 | PVA (Mg) resin | — | 97.0 | 10.65 | 64.7 | 9.7 |
| 3 | PVA resin | $CaCl_2$ | 96.7 | 10.47 | 50.2 | 14.0 |
| 4 | PVA (Ca) resin | — | 97.0 | 10.65 | 53.8 | 13.0 |
| 5 | PVA resin | $BaCl_2 \cdot 2H_2O$ | 95.4 | 10.59 | 55.1 | 12.1 |
| 6 | PVA (Ba) resin | — | 97.0 | 10.65 | 53.3 | 13.1 |

Example 3

Boron-Removing Effect of N-Methylglucamine by Added Salt

The pH of boron-containing water (30 mL), prepared so as to have an initial boron concentration of about 200 ppm, was adjusted with caustic soda, to thereby prepare raw water, and a chelate resin having an N-methylglucamine group as a functional group (Diaion: CRB02) (0.1 g) and a chelate fiber having an N-methylglucamine group as a functional group (Chelest Fiber: GRY) (0.1 g) were separately added to the raw water, followed by stirring to perform a boron-removing treatment. Note that, in the case where an added salt was used, a water obtained by preliminarily adding a salt (0.01 M) to boron-containing water was used as raw water. Changes in the concentrations of boron in the raw waters and the waters one day after the addition (treated waters) were determined with an ICP emission spectrometer. Table 3 shows the concentrations of boron in the raw waters and treated waters, the pH values adjusted, and the amounts of boron adsorbed. The results show that addition of calcium chloride (salt of alkaline earth metal) increases the amount of boron adsorbed compared with the sodium chloride-added system and the salt-unadded system (aqueous system).

Example 4

Adsorption Isotherm

Salt-added (0.01 M sodium chloride and 0.01 M calcium chloride) boron-containing waters (concentration of boron: 5 to 500 ppm) were prepared as sample waters. The sample waters (30 mL) were adjusted to pH 10.5 with caustic soda, and the boron adsorbents (PVA resin, CRB02, and GRY xerogel) (0.1 g) were separately added to the waters, followed by stirring. The reaction was performed at room temperature and completed after one day. The concentrations of boron before and after the treatment were determined with an ICP emission spectrometer. The amounts of boron adsorbed on each boron adsorbent per unit weight (mg/g) were calculated, based on the change in the concentrations of boron before and after the treatment. The amounts of boron adsorbed were plotted for the equilibrium concentration to create an adsorption isotherm (FIG. 3). The results show that the amount of boron adsorbed in the calcium chloride-added system is larger than that in the sodium chloride-added system. In particular, in the case of the PVA resin, the amount was found to be very large (FIG. 3-1).

Example 5

Salt-Concentration Dependence

Salts (sodium chloride and calcium chloride) were separately added to boron-containing water having an initial concentration of 200 ppm (30 mL), and a PVA resin (0.1 g) was added, followed by stirring. The salts (0 to 0.3 M) were added before addition of the resin. The waters were adjusted to pH 10.6 to 10.7 with caustic soda, and the reaction was performed at room temperature for one day. The amounts of boron adsorbed per unit weight of the PVA resin (mg/g) were calculated based on the change in the concentrations of boron before and after the treatment. FIG. 4 shows the salt-concentration dependence of the amount of boron adsorbed. The

TABLE 3

| Sample No. | Adsorbent | Added salt | Concentration in raw water (mg/L) | pH | Concentration in treated water (mg/L) | Amount of boron adsorbed (mg/g) |
|---|---|---|---|---|---|---|
| 1 | CRB resin | — | 200 | 10.10 | 160 | 11.9 |
| 2 | CRB resin | NaCl | 197 | 10.52 | 163 | 10.2 |
| 3 | CRB resin | $CaCl_2$ | 193 | 10.56 | 141 | 15.6 |
| 4 | GRY fiber | — | 200 | 10.63 | 177 | 7.1 |
| 5 | GRY fiber | NaCl | 197 | 10.52 | 176 | 6.0 |
| 6 | GRY fiber | $CaCl_2$ | 193 | 10.42 | 161 | 9.8 | results show that the amount of boron adsorbed gradually increases with the increase in the amount of sodium chloride added. On the other hand, the results show that addition of a small amount of calcium chloride drastically increases the amount of boron adsorbed, which then remains at an almost constant level.

Example 6

Change in Size of Xerogel

An aqueous PVA solution (10%) was poured into a cylindrical resin container with a diameter of 8.0 mm and freeze-dried. After the drying, the PVA resin (xerogel) was cut into pieces with a thickness of 4 mm and formed into disk-shaped products. The resin was immersed into salt-added water or salt-added boron-containing water (boron: 100 ppm), followed by stirring for 3 days. The waters were adjusted to pH 10.3 to 10.5 with caustic soda. After completion of the reaction, the resins were taken out, and the diameters of the resins were measured. Table 4 shows the sizes of the PVA resins. The results show that the sizes of the resins in the case of using water as a solvent (Sample Nos. 1 to 6) are significantly different from those in the case of using the boron-containing water as a solvent (Sample Nos. 7 to 12). In the case of using water as a solvent, the sizes of the PVA resins did not change greatly even if the concentration of the salt added increases. On the other hand, in the case of using the boron-containing water system, the sizes of the resins became larger in the salt-unadded system and the sodium chloride-added system (Sample Nos. 7 and 8). However, addition of calcium chloride contracted the PVA resins and decreased the sizes of the resins. It was found that the degree of contraction hardly depended on the concentration of calcium chloride, and addition of a small amount of calcium chloride contracted the PVA resin.

TABLE 4

| Sample No. | Solvent | Added salt | Concentration (M) | Diameter (mm) |
|---|---|---|---|---|
| 1 | Water | — | — | 5.44 |
| 2 | Water | NaCl | 0.01 | 5.41 |
| 3 | Water | $CaCl_2$ | 0.01 | 5.41 |
| 4 | Water | $CaCl_2$ | 0.05 | 5.38 |
| 5 | Water | $CaCl_2$ | 0.1 | 5.37 |
| 6 | Water | $CaCl_2$ | 0.3 | 5.29 |
| 7 | Boron-containing water | — | — | 6.43 |
| 8 | Boron-containing water | NaCl | 0.01 | 6.53 |
| 9 | Boron-containing water | $CaCl_2$ | 0.01 | 4.22 |
| 10 | Boron-containing water | $CaCl_2$ | 0.05 | 4.34 |
| 11 | Boron-containing water | $CaCl_2$ | 0.1 | 4.12 |
| 12 | Boron-containing water | $CaCl_2$ | 0.3 | 4.27 |

Example 7

Multistep Method

The adsorptive composition prepared in Example 2, PVA (Ca) resin, (0.33 g) was added to boron-containing water (30 mL) having an initial boron concentration of 200 ppm, and the mixture was adjusted to pH 10.7 and allowed to react with stirring for 14 hours. After the reaction, the adsorptive composition was separated and collected, and another adsorptive composition, PVA (Ca), (0.33 g) was added thereto. Then, the mixture was adjusted to pH 10.6 and allowed to react with stirring for 7 hours. After the reaction, the adsorptive composition was separated and collected, and another adsorptive composition, PVA (Ca), (0.17 g) was again added thereto. Then, the mixture was adjusted to pH 10.6 and allowed to react with stirring for 7 hours. After the reaction, the adsorptive composition was separated and collected. FIG. 5 shows the relationship between the concentration of boron after each reaction and the adsorptive composition used (total weight). The results show that the concentration of boron is reduced from 196 ppm to 9.6 ppm when about 0.8 g of the absorptive composition is used.

Example 8

Thermal Decomposition of Agent for Removing Boron

The adsorptive composition prepared in Example 2, PVA (Ca) resin, was added to boron-containing waters having initial boron concentrations of about 200 ppm and about 30 ppm and adjusted to pH 10.74 (raw waters), and the mixture was stirred for 6 hours. For comparison, boron was also removed by a coagulation process (sulfuric acid band method) using aluminum sulfate and slaked lime (inorganic chemical agents). After completion of each reaction, the resultant products were subjected to solid-liquid separation, and the solid matters were dried by heating at 50° C. Subsequently, the solid matters were placed in a crucible and heated in an electric furnace at 700° C. (1.5 hours). The residues were allowed to stand to be cooled, and the weights of the residues after thermal decomposition were measured to calculate the residue ratios (the ratios of the weights of the residues after thermal decomposition relative to the weight of the chemical agents used). As a result, in the case of the sulfuric acid band method using the inorganic chemical agents, the residue ratio was found to be about 60%, while in the case of the method of removing boron of the present invention using the PVA resin (adsorptive composition), the residue ratio was found to be 10% or less.

TABLE 5

| | Sulfuric acid band (g) | Slaked lime (g) | PVA($CaCl_2$) | Total of chemical agents (g) | Concentration in raw water (ppm) | Concentration in treated water (ppm) | Amount of boron collected (g) | After thermal decomposition (g) | Residue ratio (%) |
|---|---|---|---|---|---|---|---|---|---|
| 30 ppm/30 mL | | | | | | | | | |
| Coagulation process | 0.10 | 0.10 | — | 0.20 | 29.7 | 3.4 | 0.21 | 0.116 | 58.1 |
| PVA adsorbent | — | — | 0.27 | 0.27 | 29.7 | 9.8 | 0.21 | 0.005 | 1.7 |

TABLE 5-continued

| | Sulfuric acid band (g) | Slaked lime (g) | PVA(CaCl$_2$) | Total of chemical agents (g) | Concentration in raw water (ppm) | Concentration in treated water (ppm) | Amount of boron collected (g) | After thermal decomposition (g) | Residue ratio (%) |
|---|---|---|---|---|---|---|---|---|---|
| 200 ppm/30 mL | | | | | | | | | |
| Coagulation process | 0.20 | 0.20 | — | 0.40 | 205 | 56.3 | 0.45 | 0.250 | 62.5 |
| PVA adsorbent | — | — | 0.40 | 0.40 | 205 | 62.5 | 0.37 | 0.028 | 7.1 |

INDUSTRIAL APPLICABILITY

According to the method of removing boron of the present invention, boron that is present as a boric acid, a borate, or a borate ion can be efficiently removed with a small amount of a chemical agent from boron-containing water. Meanwhile, the amount of precipitates obtained after the removal of boron by the method of removing boron of the present invention is small, and the precipitates are easily subjected to solid-liquid separation. Therefore, if the precipitates are thermally decomposed, significant reduction in the amount of final boron-containing wastes can be achieved. The agent for removing boron of the present invention has a stable boron-removing ability even if the agent is preserved as a dried product, and hence the agent can be easily handled.

What is claimed is:

1. A method of removing boron from boron-containing water, comprising adding a xerogel of an organic polymeric compound having a cis-type diol structure and a water-soluble salt of an alkaline earth metal to boron-containing water under an alkaline condition, wherein the xerogel is formed by a freeze-drying method and has pores.

2. A method of removing boron from boron-containing water according to claim 1, wherein the organic polymeric compound is at least one selected from the group consisting of a polyvinyl alcohol, an N-methylglucamine resin, and an N-methylglucamine fiber.

3. A method of removing boron from boron-containing water according to claim 1 or 2, wherein the water-soluble salt of an alkaline earth metal is at least one selected from the group consisting of calcium chloride, calcium nitrate, calcium bromide, calcium iodide, magnesium chloride, magnesium carbonate, magnesium bromide, magnesium chromate, barium bromide, magnesium sulfate, barium iodide, barium chloride, barium sulfate, barium nitrate, and barium hydroxide.

4. An agent for removing boron from boron-containing water, comprising a xerogel of an organic polymeric compound having a cis-type diol structure and a water-soluble salt of an alkaline earth metal, wherein the xerogel is formed by a freeze-drying method and has pores.

5. An agent for removing boron from boron-containing water according to claim 4, wherein the organic polymeric compound is at least one selected from the group consisting of a polyvinyl alcohol, an N-methylglucamine resin, and an N-methylglucamine fiber.

6. An agent for removing boron from boron-containing water according to claim 4 or 5, wherein the water-soluble of an alkaline earth metal is at least one selected from the group consisting of calcium chloride, calcium nitrate, calcium bromide, calcium iodide, magnesium chloride, magnesium carbonate, magnesium bromide, magnesium chromate, barium bromide, magnesium sulfate, barium iodide, barium chloride, barium sulfate, barium nitrate, and barium hydroxide.

* * * * *